United States Patent
Kim et al.

(10) Patent No.: US 9,736,475 B2
(45) Date of Patent: Aug. 15, 2017

(54) METHOD AND APPARATUS FOR GENERATING A REFERENCE FRAME AND METHOD AND APPARATUS FOR ENCODING/DECODING IMAGE USING THE SAME

(71) Applicant: SK Telecom Co., Ltd., Seoul (KR)

(72) Inventors: Hayoon Kim, Seongnam-si (KR); Yunglyul Lee, Seoul (KR); Joohee Moon, Seoul (KR); Haekwang Kim, Seoul (KR); Byeungwoo Jeon, Seongnam-si (KR); Daeyeon Kim, Seoul (KR); Donghoon Han, Seoul (KR); Kioh Kim, Anyang-si (KR)

(73) Assignee: SK Telecom Co., Ltd., Seoul (KR)

( * ) Notice: Subject to any disclaimer, the term of this patent is extended or adjusted under 35 U.S.C. 154(b) by 9 days.

(21) Appl. No.: 14/821,788

(22) Filed: Aug. 10, 2015

(65) Prior Publication Data
US 2015/0350643 A1 Dec. 3, 2015

Related U.S. Application Data

(63) Continuation of application No. 13/124,635, filed as application No. PCT/KR2009/005779 on Oct. 9, 2009.

(30) Foreign Application Priority Data

Oct. 16, 2008 (KR) .................. 10-2008-0101742

(51) Int. Cl.
H04N 19/105 (2014.01)
H04N 19/182 (2014.01)
(Continued)

(52) U.S. Cl.
CPC ......... *H04N 19/105* (2014.11); *H04N 19/109* (2014.11); *H04N 19/117* (2014.11);
(Continued)

(58) Field of Classification Search
None
See application file for complete search history.

(56) References Cited

U.S. PATENT DOCUMENTS 7,177,359 B2 * 2/2007 Song ............... H04N 5/145
348/E5.066
2003/0156644 A1 * 8/2003 Song ............... H04N 5/145
375/240.13

(Continued)

FOREIGN PATENT DOCUMENTS

KR 100604394 B1 7/2006
KR 100718135 B1 5/2007

OTHER PUBLICATIONS

International Search Report mailed Apr. 30, 2010 for PCT/KR2009/005779.

*Primary Examiner* — Joseph Ustaris
*Assistant Examiner* — William Adrovel
(74) *Attorney, Agent, or Firm* — Hauptman Ham, LLP

(57) ABSTRACT

A method for encoding pixels in an image, includes: encoding an offset to be applied to a reference frame; generating predicted pixels of the pixels in the image, based on interpolating pixels in the reference frame and then adding the offset to the interpolated pixels; and encoding residual signals that are differences between the pixels in the image and the predicted pixels, wherein the encoding of the residual signals comprises: skipping both transform and quantization with respect to residual signals of which an encoding scheme corresponds to skipping of both transform and quantization, the encoding scheme related to transform and quantization, skipping transform and performing quan- (Continued)

tization with respect to residual signals of which the encoding scheme corresponds to skipping of transform, and performing transform and quantization with respect to residual signals of which the encoding scheme corresponds to skipping neither transform nor quantization.

9 Claims, 11 Drawing Sheets

(51) Int. Cl.
| | | |
|---|---|---|
| *H04N 19/124* | (2014.01) | |
| *H04N 19/61* | (2014.01) | |
| *H04N 19/109* | (2014.01) | |
| *H04N 19/117* | (2014.01) | |
| *H04N 19/523* | (2014.01) | |
| *H04N 19/57* | (2014.01) | |
| *H04N 19/625* | (2014.01) | |
| *H04N 19/154* | (2014.01) | |
| *H04N 19/167* | (2014.01) | |
| *H04N 19/17* | (2014.01) | |
| *H04N 19/186* | (2014.01) | |
| *H04N 19/176* | (2014.01) | |

(52) U.S. Cl.
CPC ......... *H04N 19/124* (2014.11); *H04N 19/182* (2014.11); *H04N 19/523* (2014.11); *H04N 19/57* (2014.11); *H04N 19/61* (2014.11); *H04N 19/154* (2014.11); *H04N 19/167* (2014.11); *H04N 19/17* (2014.11); *H04N 19/176* (2014.11); *H04N 19/186* (2014.11); *H04N 19/625* (2014.11)

(56) References Cited

U.S. PATENT DOCUMENTS

| | | | |
|---|---|---|---|
| 2004/0005004 A1 | 1/2004 | Demos | |
| 2004/0240549 A1* | 12/2004 | Cote | H04N 19/159 375/240.15 |
| 2006/0133506 A1 | 6/2006 | Dang | |
| 2006/0269149 A1* | 11/2006 | Song | H04N 19/176 382/232 |
| 2007/0230563 A1 | 10/2007 | Tian et al. | |
| 2009/0257500 A1 | 10/2009 | Karczewicz et al. | |
| 2011/0150072 A1* | 6/2011 | Han | H04N 19/51 375/240.01 |
| 2011/0182362 A1* | 7/2011 | Kim | H04N 19/124 375/240.16 |
| 2013/0003838 A1* | 1/2013 | Gao | H04N 19/176 375/240.12 |
| 2013/0051475 A1* | 2/2013 | Joshi | H04N 19/159 375/240.18 |

* cited by examiner

| A1 | A2 | A3 | A4 | A5 | A6 |

| B1 | B2 | B3 | B4 | B5 | B6 |

| C1 | C2 | C3 a b c C4 | | C5 | C6 |
|    |    | d e f g     | |    |    |
|    |    | h i j k     | |    |    |
|    |    | l m n o     | |    |    |
| D1 | D2 | D3          D4 | | D5 | D6 |

| E1 | E2 | E3 | E4 | E5 | E6 |

| F1 | F2 | F3 | F4 | F5 | F6 |

*FIG. 1*

| I | a | b | c |
|---|---|---|---|
| d | e | f | g |
| h | i | j | k |
| l | m | n | o |

*FIG. 3A*

| $O16_I$ | $O16_a$ | $O16_b$ | $O16_c$ |
|---|---|---|---|
| $O16_d$ | $O16_e$ | $O16_f$ | $O16_g$ |
| $O16_h$ | $O16_i$ | $O16_j$ | $O16_k$ |
| $O16_l$ | $O16_m$ | $O16_n$ | $O16_o$ |

*FIG. 3B*

| $O8_I$ | $O8_a$ | $O8_b$ | $O8_c$ |
|---|---|---|---|
| $O8_d$ | $O8_e$ | $O8_f$ | $O8_g$ |
| $O8_h$ | $O8_i$ | $O8_j$ | $O8_k$ |
| $O8_l$ | $O8_m$ | $O8_n$ | $O8_o$ |

*FIG. 3C*

A: INTER 16X16 MODE
B: INTER 8X8 MODE
C: INTER 4X4 MODE

| I1 | A1 | B1 | C1 | I2 | A2 | B2 | C2 |
|---|---|---|---|---|---|---|---|
| D1 | E2 | F1 | G1 | D2 | E2 | F2 | G2 |
| H1 | I1 | J1 | K1 | H2 | I2 | J2 | K2 |
| L1 | M1 | N1 | O1 | L2 | M2 | N2 | O2 |
| I3 | A3 | B3 | C3 | | | | |
| D3 | E3 | F3 | G3 | | | | |
| H3 | I3 | J3 | K3 | | | | |
| L3 | M3 | N3 | O3 | | | | |

| 710 | | | | | | | |
|---|---|---|---|---|---|---|---|
| I1+O16ℓ | A1+O16ₐ | B1+O16ᵦ | C1+O16ᵧ | | | | |
| D1+O16ᵈ | E1+O16ₑ | F1+O16f | G1+O16g | | | | |
| H1+O16ₕ | I1+O16ᵢ | J1+O16ⱼ | K1+O16ₖ | | | | |
| L1+O16ₗ | M1+O16ₘ | N1+O16ₙ | O1+O16ₒ | | | | |

720 above, 730 label on right.

Due to the complex layout with blocks 710, 720, 730 arranged in an L-shape, a proper rendering:

Block 720 (top-right, 4 rows × 4 cols):

| I2+O16ℓ | A2+O16ₐ | B2+O16ᵦ | C2+O16ᵧ |
|---|---|---|---|
| D2+O16ᵈ | E2+O16ₑ | F2+O16f | G2+O16g |
| H2+O16ₕ | I2+O16ᵢ | J2+O16ⱼ | K2+O16ₖ |
| L2+O16ₗ | M2+O16ₘ | N2+O16ₙ | O2+O16ₒ |

Block 710 (bottom-left) + 730 (bottom-right):

| I1+O16ℓ | A1+O16ₐ | B1+O16ᵦ | C1+O16ᵧ | I3+O16ℓ | A3+O16ₐ | B3+O16ᵦ | C3+O16ᵧ |
|---|---|---|---|---|---|---|---|
| D1+O16ᵈ | E1+O16ₑ | F1+O16f | G1+O16g | D3+O16ᵈ | E3+O16ₑ | F3+O16f | G3+O16g |
| H1+O16ₕ | I1+O16ᵢ | J1+O16ⱼ | K1+O16ₖ | H3+O16ₕ | I3+O16ᵢ | J3+O16ⱼ | K3+O16ₖ |
| L1+O16ₗ | M1+O16ₘ | N1+O16ₙ | O1+O16ₒ | L3+O16ₗ | M3+O16ₘ | N3+O16ₙ | O3+O16ₒ |

METHOD AND APPARATUS FOR GENERATING A REFERENCE FRAME AND METHOD AND APPARATUS FOR ENCODING/DECODING IMAGE USING THE SAME

CROSS-REFERENCE TO RELATED APPLICATIONS

The present application is a continuation of U.S. patent application Ser. No. 13/124,635 filed Apr. 15, 2011, which is a the National Phase application of International Application No. PCT/KR2009/005779, filed Oct. 9, 2009, which is based upon and claims the benefit of priorities from Korean Patent Application No. 2008-0101742 filed in Korea on Oct. 16, 2008. The disclosures of the above-listed applications are hereby incorporated by reference herein in their entirety.

TECHNICAL FIELD

The present disclosure relates to a method and an apparatus for encoding and decoding an image, which interpolates and processes a reference frame, and generates the reference frame.

BACKGROUND

The statements in this section merely provide background information related to the present disclosure and do not constitute the prior art.

Moving Picture Experts Group (MPEG) and Video Coding Experts Group (VCEG) have developed an improved and excellent video compression technology over existing MPEG-4 Part 2 and H.263 standards. The new standard is named H.264/AVC (Advanced Video Coding) and was released simultaneously as MPEG-4 Part 10 AVC and ITU-T Recommendation H.264.

The inventor(s) has noted that In H.264/AVC (hereinafter referred to as 'H.264'), in order to interpolate a reference frame used in the inter prediction, a reference frame interpolated with ¼ fractional pixel precision is generated using a 6-tap filter and an average value filter. More specifically, the inventor(s) has noted that the 6-tap filter is used so as to generate the ½ fractional pixel and the average value filter is used so as to generate the ¼ fractional pixel.

As described above, the inventor(s) has noted that when the inter prediction is performed based on H.264, a motion is predicted and compensated with the ¼ fractional pixel precision by using the reference frame interpolated in the fractional pixel precision, so that it is possible to obtain the higher compression efficiency than the known method which uses only the reference frame having the integer pixel precision.

However, the inventor(s) has noted that in the known compression technology, such as the aforementioned H.264, the reference frame is interpolated using only a fixed filter. Therefore, the inventor(s) has experienced that there is a problem in that when an image with a brightness change according to a time, such as lighting change, fade-in, or fade-out, is encoded, the change of a brightness signal is not taken into consideration, so that it fails to effectively predict the motion.

SUMMARY

In accordance with some embodiments of the present disclosure, an apparatus for encoding pixels in an image performs a method comprising: encoding an offset to be applied to a reference frame; generating predicted pixels of the pixels in the image, based on interpolating pixels in the reference frame and then adding the offset to the interpolated pixels; and encoding residual signals that are differences between the pixels in the image and the predicted pixels. The encoding of the residual signals comprises: skipping both transform and quantization with respect to residual signals of which an encoding scheme corresponds to skipping of both transform and quantization, the encoding scheme related to transform and quantization, skipping transform and performing quantization with respect to residual signals of which the encoding scheme corresponds to skipping of transform, and performing transform and quantization with respect to residual signals of which the encoding scheme corresponds to skipping neither transform nor quantization.

In accordance with some embodiments of the present disclosure, an apparatus for encoding pixels in an image, comprises an interpolation unit, an offset adder, and an encoder. The interpolation unit is configured to interpolate pixels in a reference frame. The offset adder is configured to add the interpolated pixels to an offset to be applied to the reference frame, and thereby generate predicted pixels of the pixels in the image. And the encoder is configured to encode the offset to be applied to the reference frame, and encode residual signals that are differences between the pixels in the image and the predicted pixels, by skipping both transform and quantization with respect to residual signals of which an encoding scheme corresponds to skipping of both transform and quantization, the encoding scheme related to transform and quantization, skipping transform and performing quantization with respect to residual signals of which the encoding scheme corresponds to skipping of transform, and performing transform and quantization with respect to residual signals of which the encoding scheme corresponds to skipping neither transform nor quantization.

DESCRIPTION OF DRAWINGS

FIG. 1 is an exemplary diagram of a relation between a reference frame interpolated per fractional pixel and a pixel position of an integer pixel;

FIGS. 3A to 3C are diagrams of offsets for respective pixels according to a block mode;

FIG. 6 is an exemplary diagram of a part of pixels of a reference frame interpolated per ¼ fractional pixel;

FIG. 7 is an exemplary diagram of a result of the addition of an offset for each pixel according to an inter 16×16 mode to a part of pixels of a reference frame interpolated per ¼ fractional pixel;

DETAILED DESCRIPTION

Figure 2:
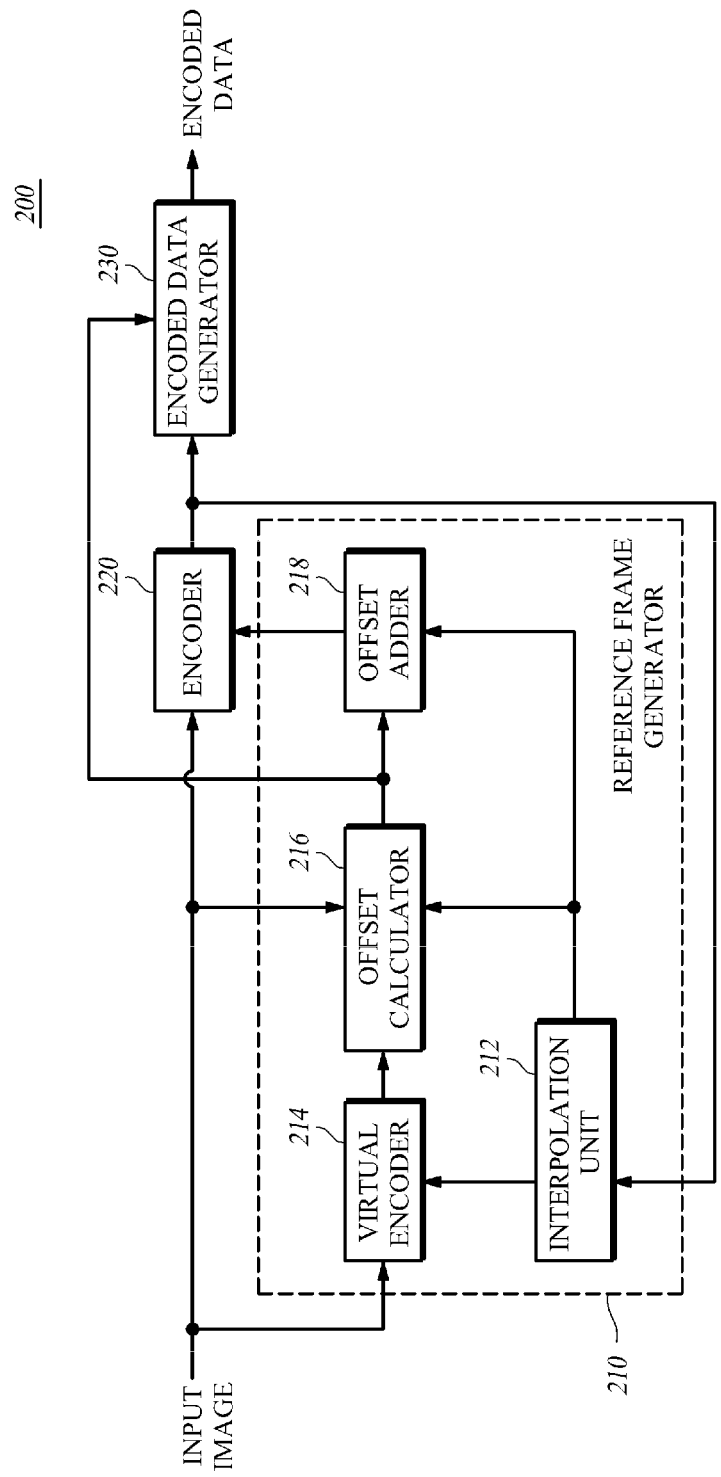
FIG. 2 is a schematic block diagram of a construction of an image encoding apparatus according to at least one embodiment of the present disclosure.

Hereinafter, aspects of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Also, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

Some embodiments of the present disclosure provide to more accurately predict the motion by assimilating a reference frame to be used for the prediction into a current frame to be encoded, and thus improve the encoding efficiency and the compression efficiency.

FIG. 1 is an exemplary diagram of a relation between a reference frame interpolated per fractional pixel and a pixel position of an integer pixel.

Referring to FIG. 1, An, Bn, Cn, Dn, En, and Fn refer to integer pixels (wherein, n=1, 2, 3, 4, and 5), and b, h, and j refer to ½ fractional pixels generated by 6-tap filtering the integer pixels. The 6-tap filter has coefficients of (1, −5, 20, 20, −5, 1)/32 for the 6-tap filtering. By applying the 6-tap filter to the six integer pixels in a vertical or horizontal direction and 6-tap filtering the six integer pixels, the ½ fractional pixels are generated. For example, it is possible to obtain ½ fractional pixel (b) by applying the 6-tap filter to horizontal integer pixels C1, C2, C3, C4, C5, and C6, which can be expressed by Equation 1 below.

$$b = \text{round}((C1 - 5 \times C2 + 20 \times C3 + 20 \times C4 - 5 \times C5 + C6)/32) \quad \text{Equation 1}$$

Herein, round( ) refers to a round-off calculation into an integer. Remaining ¼ fractional pixels a, c, d, e, f, g, i, k, l, m, n, and o, except for b, h, and j, are generated by average value filtering of the integer pixels and the ½ fractional pixels. For example, by the average value filtering of integer pixel C3 and ½ fractional pixel (b), ¼ fractional pixel (a) is linearly interpolated and generated. This can be expressed by Equation 2.

$$a = \text{round}((C1 + b)/2) \quad \text{Equation 2}$$

As described above, in the compression technology, such as H.264, by way of the generation of ½ fractional pixels by using integer pixels and the generation of ¼ fractional pixels by using integer pixels and ½ fractional pixels, a reference frame interpolated per ¼ fractional pixel as illustrated in FIG. 1 is generated and the motion prediction for the inter prediction is performed using the interpolated reference frames.

FIG. 2 is a schematic block diagram illustrating a construction of an image encoding apparatus according to at least one embodiment of the present disclosure.

Referring to FIG. 2, the image encoding apparatus 200 according to at least one embodiment of the present disclosure includes a reference frame generator 210, an encoder 220, and an encoded data generator 230. The image encoding apparatus 200 can be a personal computer (PC), a notebook computer, a personal digital assistant (PDA), a portable multimedia player (PMP), a PlayStation Portable (PSP), a mobile communication terminal, etc. Further, the image encoding apparatus 200 refers to various devices including a communication device apparatus, such as a communication modem, for communicating with various devices or a wired/wireless communication network, a memory for storing various programs and data for encoding an image, and a microprocessor, etc., for calculating and controlling by executing a program. Each of the reference frame generator 210, the encoder 220, and the encoded data generator 230 is implemented by, or includes, one or more processors and/or application-specific integrated circuits (ASICs) specified for respectively corresponding operations and functions described herein in the present disclosure.

The reference frame generator 210 generates an offset-interpolated reference frame by adding an offset for each pixel to the reference frame interpolated per fractional pixel. Although the reference frame generator 210 is implemented as an element within the image encoding apparatus 200 in FIG. 2, the reference frame generator can be implemented as a single independent device, i.e. a reference frame generation device according to the aspect of the present disclosure. Further, the reference frame generator 210 may include an interpolation unit 212, a virtual encoder 214, an offset calculator 216, and an offset adder 218.

The interpolation unit 212 interpolates the reference frame by the unit of fractional pixel. That is, the interpolation unit 212 interpolates the reference frame outputted from the encoder 220 by the unit of fractional pixel and outputs the interpolated reference frame as described above with reference to FIG. 1. At this time, in interpolating the reference frame, the interpolation unit 212 can interpolate the reference frame by the unit of either ½ fractional pixel or ¼ fractional pixel.

The virtual encoder 214 determines a block mode of a current frame and a motion vector according to the block mode of the current frame by using the interpolated reference frame. That is, the virtual encoder 214 determines the block mode of the current frame by using the interpolated reference frame outputted from the interpolation unit 212 and estimates a motion of the current block to be currently encoded according to the determined block mode, thereby determining the motion vector. Here, the virtual encoder 214 performs the inter prediction encoding, but does not generate the encoded data and the reference frame. Instead, the virtual encoder 214 can determine and output the block mode of the current frame and the motion vector according to the block mode.

Further, the virtual encoder 214 can determine the block mode of the current frame by determining one block mode from multiple preset block modes by using the Rate-Distortion Optimization (RDO). Further, the virtual encoder 214 can determine the motion vector according to the block mode by using various methods, such as RDO, boundary pixel matching, and adjacent pixel matching. Herein, under H.264/AVC standard, the multiple block modes can be SKIP mode, inter 16×16 mode, inter 16×8 mode, inter 8×16 mode, inter 8×8 mode, inter 8×4 mode, inter 4×8 mode, inter 4×4 mode, intra 16×16 mode, intra 4×4 mode, etc., but are not limited thereto and can be other various block modes.

The offset calculator 216 calculates an offset for each pixel of the interpolated reference frame by using the block mode and the motion vector. That is, the offset calculator 216 calculates the offset for each pixel of the interpolated reference frame outputted from the interpolation unit 212 by using the block mode of the current frame and the motion vector according to the block mode of the current frame outputted from the virtual encoder 214.

Here, the offset calculator 216 can calculate the difference between a pixel value of each pixel of the block according to the block mode and a pixel value of each pixel of the block indicated by the motion vector of the block in the interpolated reference frame as the offset for each pixel. Referring to FIGS. 3A to 3C exemplarily illustrating the offset for each pixel according to the block mode, when the reference frame is interpolated by ¼ fractional pixel by the interpolation unit 212, fifteen fractional pixels (a) to (o) are generated for every single pixel (l) in the interpolated reference frame as shown in FIG. 3A. In this regard, if one block mode from the block modes of the current frame determined by the virtual encoder 214 is the inter 16×16 mode, the offset for each pixel according to the block mode determined as the inter 16×16 mode may be the difference between the pixel value of each pixel (including one integer pixel and 15 fractional pixels) of the block mode determined as the inter 16×16 mode and the pixel value of each pixel (including one integer pixel and 15 fractional pixels) of the block indicated by the motion vector of a corresponding block determined as the inter 16×16 mode in the interpolated reference frame. The offset for the pixel according to the block mode determined as the inter 16×16 mode can be illustrated as FIG. 3B. If the determined block mode is the inter 8×8 mode, the offset for the pixel according to the block determined as the inter 8×8 mode can be calculated by using the same method as used in the event of the inter 16×16 mode, and be illustrated as FIG. 3C. At this time, in regard to the offset for each pixel, the offset can be calculated for each pixel of the interpolated reference frame as described above, but can also be calculated per frame or per block.

If the offset is calculated by frame, the offset for each pixel may be an average value of the offset(s) for one or more pixels at corresponding positions within the interpolated reference frame. For example, the offset for integer pixel C3 of the interpolated reference frame shown in FIG. 1 can be obtained by calculating an average of the offsets for integer pixels A1 to A5, B1 to B6, C1, C2, C4 to C6, E1 to E6, and F1 to F6 within the interpolated reference frame. In this case, the offset for each of the integer pixels within the interpolated reference frame may be the same. Similarly, the offset for each of fractional pixels (a) to (o) within the interpolated reference frame shown in FIG. 1 can be obtained by calculating an average of the offset for each of the fractional pixels interpolated and generated from each of the integer pixels. In this case, the offsets for the fractional pixels within the interpolated reference frame may be the same.

If the offset is calculated by block, the offset for each pixel may be an average value of the offset(s) for one or more pixels at corresponding positions within the block according to the block mode of the interpolated reference frame. For example, when it is assumed that integer pixel C3 of the interpolated reference frame shown in FIG. 1 is included in the same block as that of other integer pixels C4 to C6, D3 to D6, E3 to E6, and F3 to F6, the offset for integer pixel C3 can be obtained by calculating an average of the offsets for integer pixels C4 to C6, D3 to D6, E3 to E6, and F3 to F6 within the block. In this case, the offset for each of the integer pixels within the corresponding block may be the same. Similarly, the offset for each of fractional pixels (a) to (o) within the interpolated reference frame shown in FIG. 1 can be obtained by calculating an average of the offset for each of the fractional pixels interpolated and generated from each of the integer pixels within the corresponding block. In this case, the offset for each of the fractional pixels within the corresponding block may be the same according to the position.

Therefore, the offset for each of the integer pixels according to the block mode as illustrated in FIGS. 3B and 3C can be individually calculated for each pixel in the interpolated reference frame, can be identically calculated for each pixel in the interpolated reference frame, or can be identically calculated for each pixel within the block of the interpolated reference frame, depending on the offset calculation unit, by which the offset is calculated, from the pixels, the blocks, and the frames.

Further, the offset calculator 216 calculates the offset of each pixel for each individual block mode or calculates the offset of each pixel for each set of the block modes. That is, even when the block modes are the same, the offset calculator 216 may calculate the offset of each pixel for each block determined according to the block mode, or may select the set of the identical blocks having the identical block mode and calculate the offset of each pixel for the corresponding blocks by the aforementioned scheme.

Figure 4:
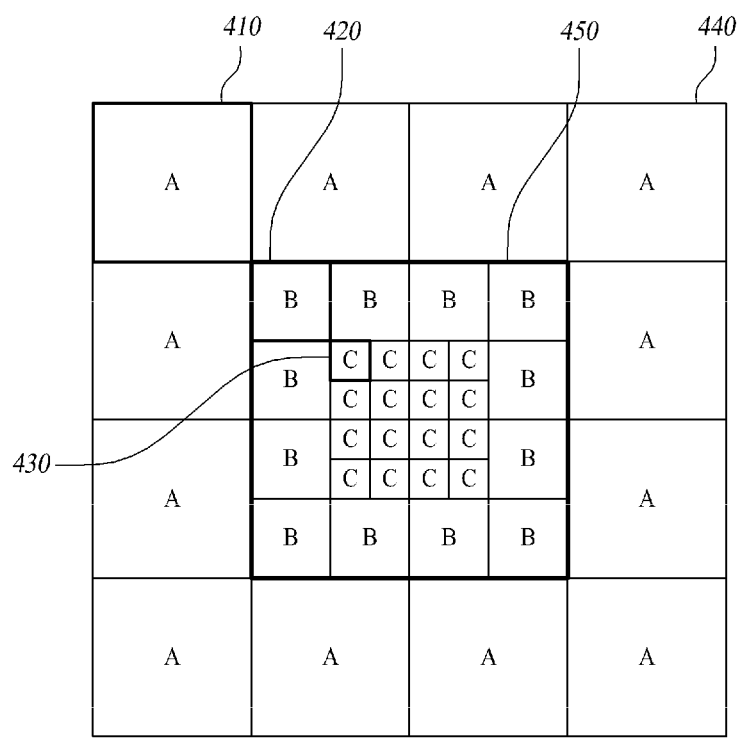
FIG. 4 is an exemplary diagram of a block mode determined for a current frame.

Referring to FIG. 4 exemplarily illustrating the block mode determined for the current frame, the virtual encoder 214 determines 40 block modes by using the interpolated reference frame as the block modes of the current frame. In FIG. 4, 12 A blocks 410 refer to the blocks determined as the inter 16×16 mode, and 12 B blocks 420 refer to the blocks determined as the inter 8×8 mode, and 16 C blocks 430 refer to the blocks determined as the inter 4×4 mode.

In case the offset for each pixel is calculated according to the block mode, the offset calculator 216 may calculate the offset of each pixel for each of all the 40 block modes, or calculate the offset of each pixel for each type of the same type block modes. That is, the offset calculator 216 calculates the offset for each pixel according to the 12 inter 16×16 mode blocks, the offset for each pixel according to the 12 inter 8×8 mode blocks, and the offset for each pixel according to the 16 inter 4×4 mode blocks. Further, the offset calculator 216 can calculate the offset for each pixel according to the three block modes including the offset for each pixel according to a single inter 16×16 mode, the offset for each pixel according to a single inter 8×8 mode, and the offset for each pixel according to a single inter 4×4 mode.

In case the offset calculator 216 calculates the offset of each pixel for each set of the block modes, the offset calculator 216 may define a block mode set by collecting multiple block modes into a predetermined set and calculate the offset of each pixel for each defined block mode set. That is, the offset calculator 216 defines a block mode set 440 by selecting A blocks 410 determined as the inter 16×16 mode, defines another block mode set 450 by selecting the B blocks 430 determined as the inter 8×8 mode and the C blocks 450 determined as the inter 4×4 mode, and calculates the offset of each pixel for each of the block mode sets 440 and 450.

Each of the block modes 410 and 430 and each of the sets 440 and 450 of the block modes of the current frame illustrated in FIG. 4 are only simple examples, and it is possible to determine the block modes or the sets of the block modes in other various schemes.

The offset adder 218 generates an offset interpolated reference frame by adding the offset for each pixel to each pixel of the interpolated reference frame. That is, the offset adder 218 generates and outputs the offset interpolated reference frame by adding the offset for each pixel of the interpolated reference frame outputted from the offset calculator 216 to each pixel at the same position in the interpolated reference frame outputted from the interpolation unit 212.

Figure 5:
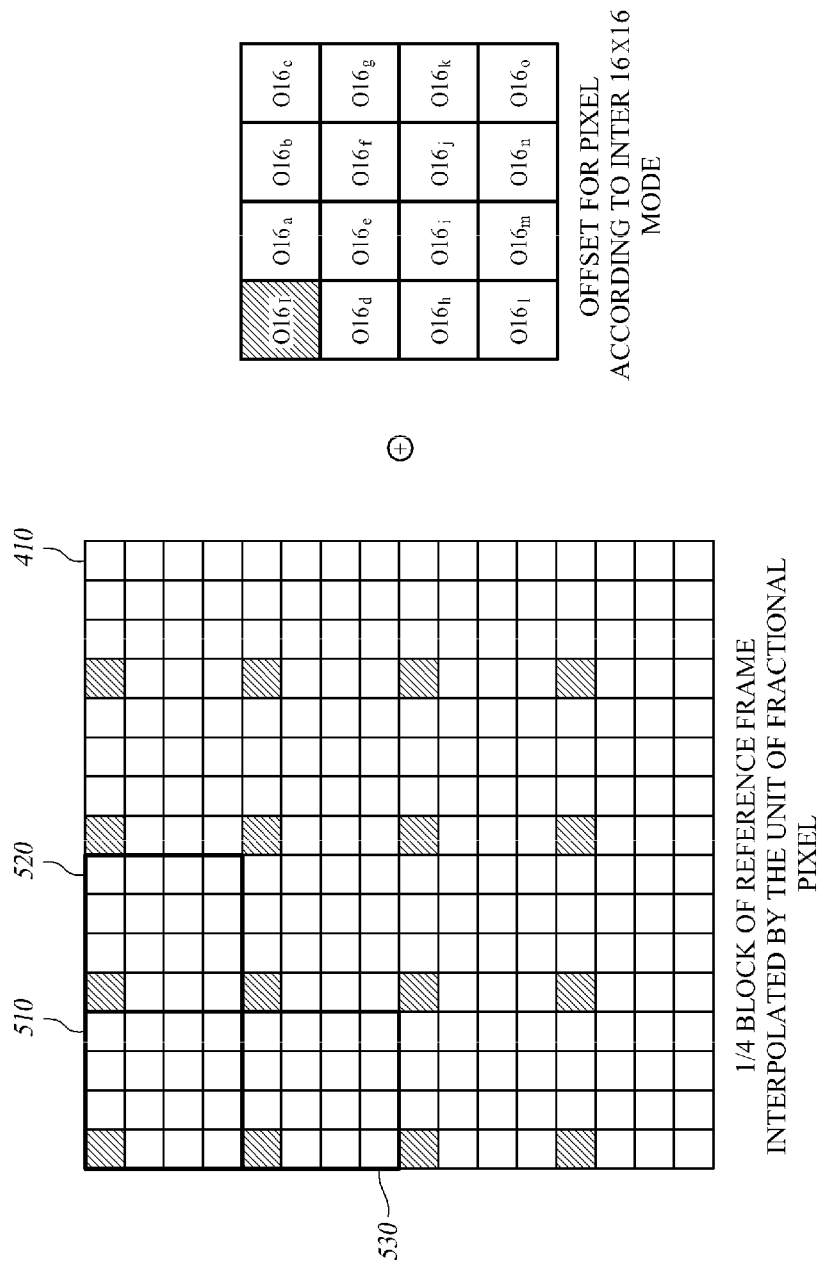
FIG. 5 is an exemplary diagram of a process of adding an offset for each pixel according to an inter 16×16 mode to a reference frame interpolated per ¼ fractional pixel.

Referring to FIG. 5 exemplarily illustrating a process of adding the offset for each pixel according to the inter 16×16 mode to the reference frame interpolated per ¼ fractional pixel, the offset adder 218 generates the offset interpolated reference frame for the inter 16×16 mode by adding the offset for each pixel according to the inter 16×16 mode shown in FIG. 3B to the A block 410 determined as the inter 16×16 mode shown in FIG. 4. For the purpose of description, FIG. 5 represents only 16 integer pixels of the A blocks 410 determined as the inter 16×16 mode together with 15 fractional pixels for each of the integer pixels.

For example, if certain pixels 510, 520, and 530 of the A block 410 determined as the inter 16×16 mode in the reference frame illustrated in FIG. 5 display an arrangement as shown in FIG. 6, the offset adder 218 may generate pixels 710, 720, and 730 of the offset interpolated reference frame as shown in FIG. 7 by adding the offset for each pixel according to the inter 16×16 mode shown in FIG. 3B to the pixels 510, 520, and 530 shown in FIG. 6. In FIGS. 6, 11 to 13 refer to integer pixels and the others correspond to fractional pixels. As illustrated in FIG. 6, the offset for each of the integer pixels from the offset for each pixel according to the inter 16×16 mode can be added to the partial pixels 510, 520, and 530 of the A block 410 determined as the inter 16×16 mode, and the offsets for the remaining pixels can be added to the remaining pixels at the same position.

Further, the offset adder 218 may generate either an offset interpolated reference frame for each block mode or an offset interpolated reference frame for each block mode set. That is, in generating the offset interpolated reference frame, the offset adder 218 uses the offset for each pixel according to the block mode outputted from the offset calculator 216. In this event, if the offset calculator 216 calculates the offsets of pixels for each block mode, the offset adder 218 may generate the offset interpolated reference frames, the number of which is equal to the number of the same type block modes or the number of all the block modes. If the offset calculator 216 calculates the offset of each pixel for each block mode set, the offset adder 218 can generate as many offset interpolated reference frames as the block mode sets.

The encoder 220 encodes a residual block of the current block generated using the offset interpolated reference frame. That is, the encoder 220 inter-prediction encodes the current block by using the offset interpolated reference frame outputted from the offset adder 218 of the reference frame generator 210, in which the encoder 220 encodes the residual block generated through a subtraction between the current block and a predicted block generated by predicting the current block by using the offset interpolated reference frame.

To this end, the encoder 220 predicts a pixel value of each pixel of the current block and generates a predicted block having a predicted pixel value of each of the predicted pixels. The encoder 220 can generate the residual block having a block type residual signal by calculating a difference between the pixel value of each pixel of the current block and the predicted pixel value of each pixel of the predicted block.

Further, the encoder 220 may transform and quantize the residual block and output the quantized residual block, in which each of the pixel values of the residual block is transformed into a frequency coefficient by transforming a residual signal of the residual bock into a frequency domain signal, and the residual block having the frequency coefficient is then quantized. Here, the encoder 220 transforms the residual signal to the frequency domain signal by using various conversion schemes, such as Hadamard Transform and Discrete Cosine Transform Based Transform (DCT based Transform), which transform an image signal of a spatial axis to an image signal of a frequency axis. At this time, the residual signal transformed to the frequency domain signal serves as a frequency coefficient.

Further, the encoder 220 quantizes the transformed residual block by using Dead Zone Uniform Threshold Quantization (DZUTQ), Quantization Weighted Matrix, or their improved quantization scheme. In the meantime, instead of transforming and quantizing the residual block as described above, the encoder 220 may transform the residual signal of the residual block to generate the residual block having the frequency coefficient while omitting the quantization process, may perform only the quantization without converting the residual signal of the residual block to the frequency efficient, or may not perform both the transform and the quantization.

Further, the encoder 220 scans the quantized frequency coefficient, the frequency coefficient, or the residual signal of the residual block by various scanning schemes, such as a zigzag scan, generates a quantized frequency coefficient sequence, a frequency coefficient sequence, or a signal sequence, and encodes them by using various encoding schemes, such as an entropy coding scheme.

Further, the encoder 220 reconstructs the residual block by inverse quantizing and inverse transforming the quantized residual block. That is, the encoder 220 generates the residual block having the frequency coefficient by dequantizing the quantized frequency coefficients of the quantized residual block, and generates the residual block having the pixel value, i.e. the reconstructed residual block by inverse transforming the dequantized residual block. Here, the encoder 220 performs the inverse transform and the dequantization by using schemes reverse to the aforementioned transform scheme and quantization scheme. Further, when the encoder 200 performs the transform alone without performing the quantization, the encoder 200 may perform the inverse transform alone without the dequantization. Likewise, when the encoder 200 performs the quantization alone without the transform, the encoder 200 may perform the dequantization alone without the inverse transform. If the encoder 220 performs neither the transform nor the quantization, the encoder 220 may perform neither the inverse transform nor the dequantization.

Further, the encoder 220 can reconstruct the current block by adding the predicted block and the reconstructed residual block, output the reference frame by storing the reconstructed current block frame by frame, and encode the block mode and the motion vector.

The encoded data generator 230 encodes the offset for each pixel of the reference frame and generates encoded data including the encoded residual block and the encoded offset for each pixel. That is, the encoded data generator 230 encodes the offset for each pixel of the reference frame outputted from the offset calculator 216, and generates and outputs the encoded data including the encoded residual block outputted from the encoder 220 and the encoded offset for each pixel.

Further, when the offset for each pixel of the reference frame is calculated by the unit of frame, the encoded data generator 230 may include the encoded offset for each pixel in a frame header or a slice header of the encoded data. Further, when the offset for each pixel of the reference frame is calculated by the unit of block, the encoded data generator 230 can include the encoded offset for each pixel in a block header of the encoded data. The encoded data generator 230 may additionally include the encoded block mode and the encoded motion vector outputted from the encoder 220 in the encoded data.

Figure 8:
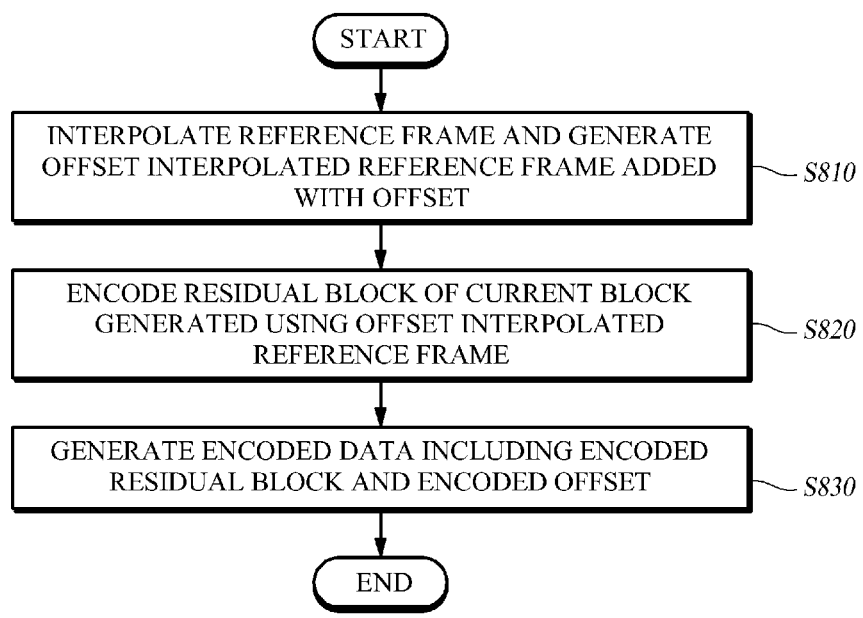
FIG. 8 is a flowchart of an image encoding method according to at least one embodiment of the present disclosure.

FIG. 8 is a flowchart of an image encoding method according to at least one embodiment of the present disclosure.

The image encoding apparatus 200 interpolates a reference frame per fractional pixel, adds an offset for each pixel of the reference frame to the interpolated reference frame, and generates an offset-added reference frame (step S810).

The image encoding apparatus 200 generates and encodes a residual block of the current block by predicting a current block by using the offset-added reference frame (step S820). That is, by estimating and compensating for a motion of a current block by using the offset-added reference frame, in which the offset for each pixel of the reference frame is added to the interpolated reference frame, instead of using the conventional reference frame or the conventional interpolated reference frame, the image encoding apparatus 200 generates and encodes the residual block by deducting the predicted block and the current block.

The image encoding apparatus 200 generates and outputs encoded data including the encoded residual block and the encoded offset (step S830).

Figure 9:
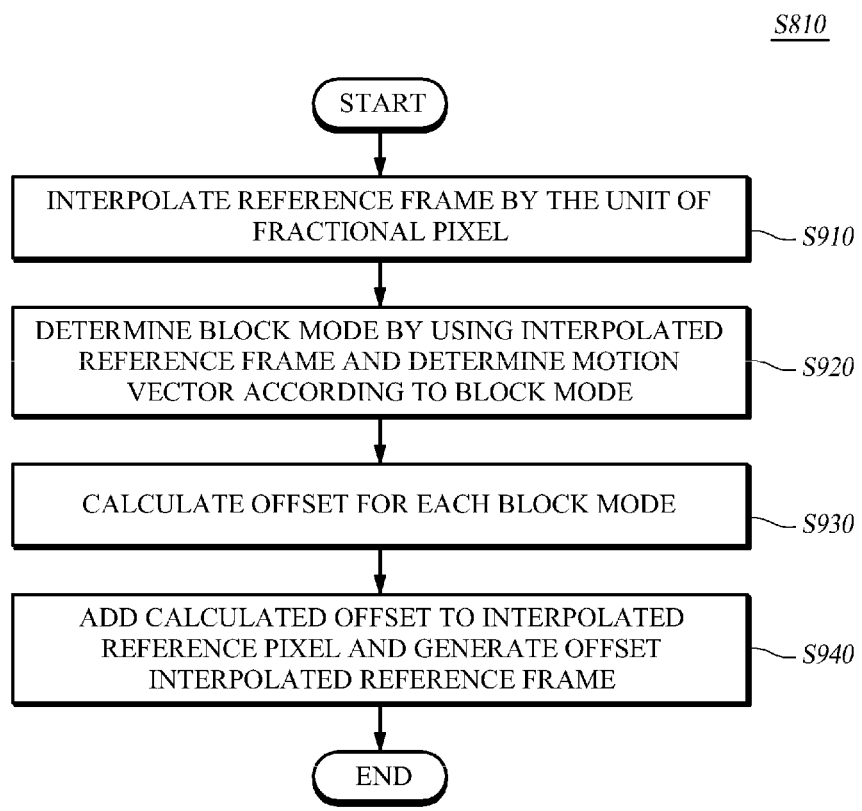
FIG. 9 is a flowchart of a reference frame generation method according to at least one embodiment of the present disclosure.

FIG. 9 is a flowchart of a reference frame generation method according to at least one embodiment of the present disclosure.

The reference frame generator 210 interpolates the reference frame, which has been reconstructed and stored through the previous encoding and decoding processes, by using various filters, etc., by the unit of fractional pixel (step S910). The reference frame generator 210 determines a block mode of the current frame and a motion vector according to the block mode by performing an encoding process by using the interpolated reference frame (step S920). The reference frame generator 210 calculates an offset for each pixel of the reference frame according to each block mode (step S930). The reference frame generator 210 generates an offset interpolated reference frame by adding the calculated offset for each pixel of the reference frame according to each block mode to the interpolated reference frame (step S940).

As described above, the image which has been encoded into encoded data by the image encoding apparatus 200 may be transmitted to an image decoding apparatus to be described later via a wire/wireless communication network, such as the internet, a local wireless communication network, a wireless LAN network, a Wibro (Wireless Broadband) network also known as WiMax network, and a mobile communication network, or a communication interface, such as a cable and a Universal Serial Bus (USB) in real time or in non-real time, so that the transmitted image can be decoded in the image decoding apparatus, and the decoded image can be reconstructed and reproduced.

Figure 10:
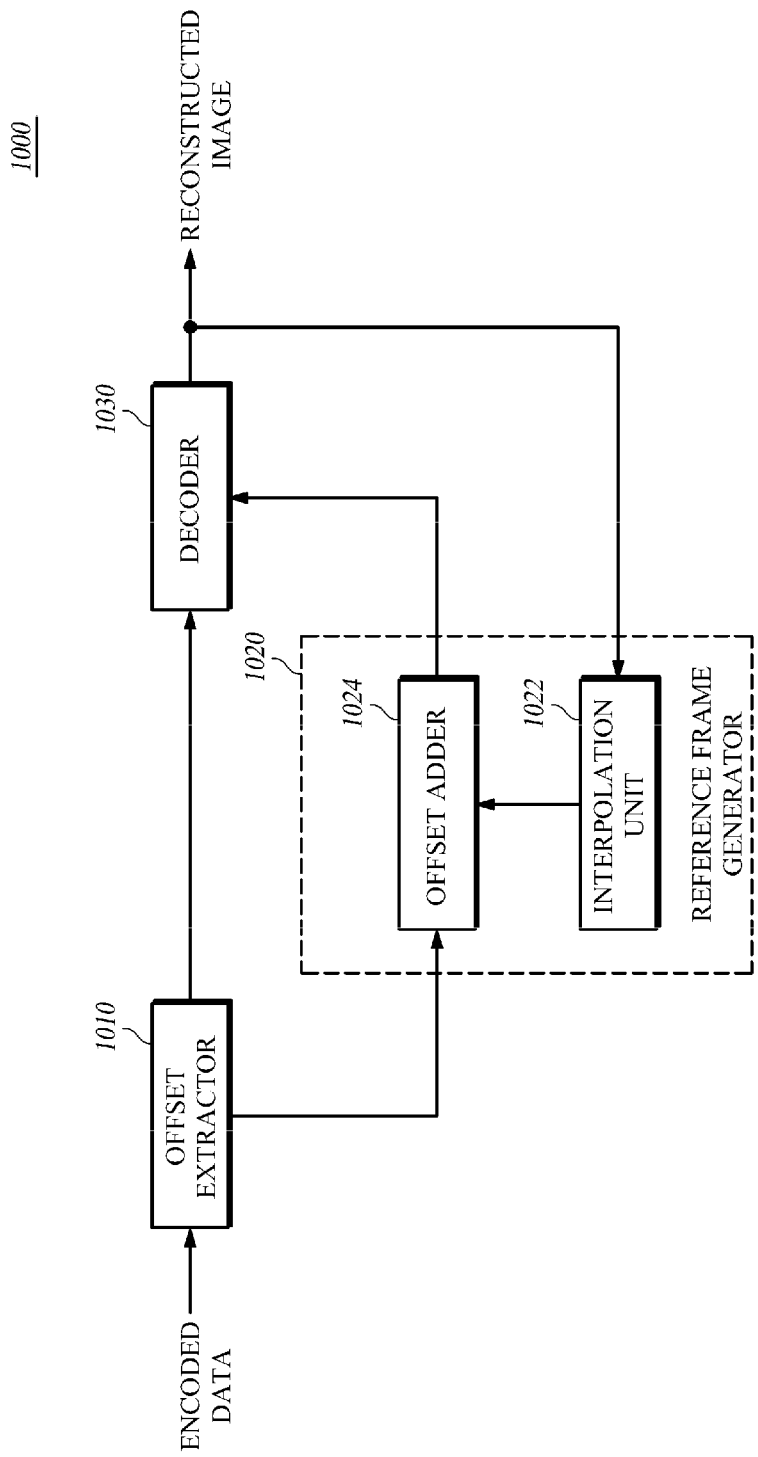
FIG. 10 is a schematic block diagram of a construction of an image decoding apparatus according to at least one embodiment of the present disclosure.

FIG. 10 is a schematic block diagram illustrating a construction of the image decoding apparatus according to at least one embodiment of the present disclosure.

The image decoding apparatus 1000 according to at least one embodiment of the present disclosure includes an offset extractor 1010, a reference frame generator 1020, and a decoder 1030. The image decoding apparatus 1000 can be a Personal Computer (PC), a notebook computer, a Personal Digital Assistant (PDA), a Portable Multimedia Player (PMP), a PlayStation Portable (PSP), a mobile communication terminal, etc. Further, the image decoding apparatus 1000 refers to various devices including a communication device apparatus, such as a communication modem, for communicating with various devices or a wire/wireless communication network, a memory for storing various programs and data for encoding an image, and a microprocessor, etc., for calculating and controlling by executing a program. Each of the offset extractor 1010, the reference frame generator 1020, and the decoder 1030 is implemented by, or includes, one or more processors and/or application-specific integrated circuits (ASICs) specified for respectively corresponding operations and functions described herein in the present disclosure.

The offset extractor 1010 extracts and then decodes the encoded offset for each pixel from the encoded data and thereby reconstructs the offset for each pixel. Here, the offset extractor 1010 can extract the encoded offset for each pixel from the frame header or the slice header of the encoded data, or extract the encoded offset for each pixel from the block header of the encoded data.

The reference frame generator 1020 generates the offset interpolated reference frame by adding the extracted offset for each pixel to the reference frame interpolated per fractional pixel. To this end, as illustrated in FIG. 10, the reference frame generator 1020 includes: an interpolation unit 1022 for interpolating the reference frame outputted from the decoder 1030 by fractional pixel and generating the interpolated reference frame; and an offset adder 1024 for adding the offset for each pixel outputted from the offset extractor 1010 to each pixel of the interpolated reference frame outputted from the interpolation unit 1022 and thereby generating and outputting the offset interpolated reference frame. Here, the interpolation unit 1022 and the offset adder 1024 generate the interpolated reference frame and add the offset for each pixel to the reference frame by the method identical or similar to that of the interpolation unit 212 and the offset adder 218 previously described with reference to FIG. 2, so that the detail-description of the relevant method will be omitted.

However, the offset extractor 1010 also extracts information of the block mode from the encoded data or performs decoding if the extracted information of the block mode is encoded. In this event, the offset adder 1024 may add the offset for each pixel to the interpolated reference frame depending on the block mode according to the information of the bock mode outputted from the offset extractor 1010. That is, the offset adder 1024 can generate the offset interpolated reference frame for each block mode and generate the offset interpolated reference frame for each block mode set. In this event, the offset interpolated reference frames in a number equal to the number of block modes or in a number equal to the number of sets of the block modes can be generated.

Further, when the offset extractor 1010 extracts the encoded offset for each pixel from the frame header or the slice header, the offset adder 1024 may add the reconstructed offset for each pixel to the interpolated reference frame per frame. Further, when the offset extractor 1010 extracts the encoded offset for each pixel from the block header, the offset adder 1024 may add the extracted offset for each pixel to the interpolated reference frame per block.

The decoder 1030 reconstructs the residual block by decoding the encoded residual block included in the encoded data, and adds the predicted block of the current block generated by using the offset interpolated reference frame and the reconstructed residual block, to reconstruct the current block. That is, the decoder 1030 reconstructs the residual block by decoding the encoded residual block included in the encoded data (from which the encoded offset for each pixel is extracted) outputted from the offset extractor 1010, generates the predicted block by compensating for the motion of the current block by using the offset interpolated reference frame outputted from the reference frame generator 1020, and adds the predicted block and the reconstructed residual block, to reconstruct and output the current block. The outputted current block can be stored per frame and outputted as the reconstructed image or the reference frame.

Here, in decoding the encoded residual block, the decoder 1030 may use the encoding scheme used for encoding the residual block by the encoder 220 aforementioned with reference to FIG. 2. In reconstructing the decoded residual block, the decoder 1030 performs the inverse quantization and the inverse transform, which can be identical to or similar to the inverse quantization and the inverse transform performed by the encoder 220 aforementioned with reference to FIG. 2, and those skilled in the art can directly implement the decoder 1030 through the description with reference to FIG. 2, so that its detail-description will be omitted.

Figure 11:
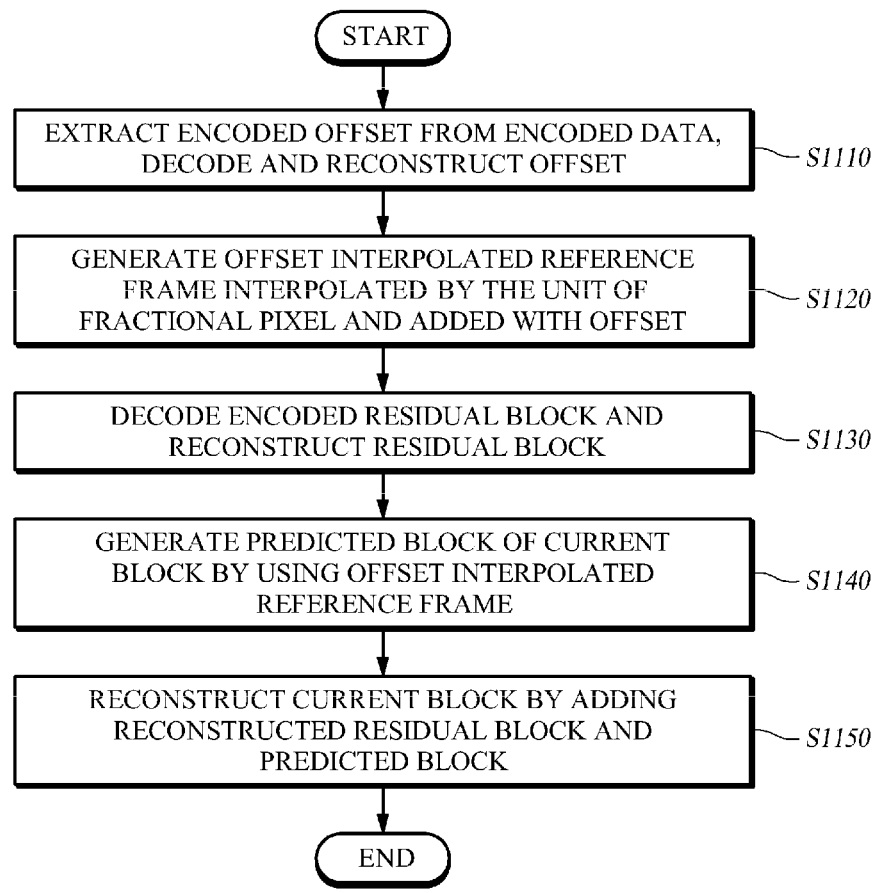
FIG. 11 is a flowchart of an image decoding method according to at least one embodiment of the present disclosure.

FIG. 11 is a flowchart of an image decoding method according to at least one embodiment of the present disclosure.

The image decoding apparatus 1000, which has received and stored encoded data for an image through a wired/wireless communication network or a cable, decodes and reconstructs the image so as to reproduce the image according to a user's selection or an algorithm of another executed program.

To this end, the image decoding apparatus 1000 reconstructs the offset for each pixel by extracting and the encoded offset for each pixel from the encoded data and decoding the extracted offset (step S1110), and adds the reconstructed offset for each pixel to each pixel of the interpolated reference frame interpolated per fractional pixel and generates the offset interpolated reference frame (step S1120). Further, the image decoding apparatus 1000 reconstructs the residual block by decoding the encoded residual block included in the encoded data (step S1130), generates the predicted block of the current block by compensating for the motion of the current block by using the offset interpolated reference frame (step S1140), and reconstructs the current block by adding the reconstructed residual block and the predicted block (step S1150). The reconstructed current block is accumulated frame by frame and then outputted as the reconstructed image.

Although the image encoding apparatus 200 generates the offset interpolated reference frame according to the aspect of the disclosure in the above description, the present disclosure is not limited to the above aspect. As noted in another aspect to be described below, the present disclosure can interpolate the reference frame per pixel, calculate the offset per pixel, add the calculated offset to the interpolated reference frame, to thereby perform the inter prediction.

In the image encoding method according to another aspect of the present disclosure, it is possible to generate the pixels interpolated per fractional pixel by using the pixels of the reference frame, add the offset to the interpolated pixels, perform the inter prediction encoding for the current block by using the interpolated pixels added with the offset, encode the offset, and output the encoded data including the encoded offset and the inter prediction encoded current block, thereby encoding the image. Here, the offset can be calculated according to the block mode of the current block, and be determined according to the position of the integer pixel or the position of the fractional pixel.

In the image decoding method according to another aspect of the present disclosure, it is possible to extract the encoded residual block from the encoded data and the encoded offset, decode the encoded residual block and the encoded offset to reconstruct the residual block and the offset, generate the interpolated pixels per fractional pixel by using the pixels of the reference frame, add the reconstructed offset to the interpolated pixels, and adds the predicted block generated by inter predicting the current block by using the pixels interpolated and added with the offset and the reconstructed residual block to reconstruct the current block, thereby decoding the image. Here, the offset can be calculated according to the block mode of the current block, and be determined according to the position of the integer pixel or the position of the fractional pixel.

According to various embodiments of the disclosure as described above, by adding the offset calculated according to the block mode to the reference frame for the inter prediction and making the reference frame to be used for the motion estimation and compensation be similar to the current frame to be encoded, various embodiments of the present disclosure can more accurately predict the motion and thus improve the efficiency of the encoding and the compression.

In the description above, although the components of the aspects of the present disclosure have been explained as assembled or operatively connected as a unit, the present disclosure is not intended to limit itself to such aspects. Rather, within the objective scope of the claimed invention, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program is easily deduced by a person of ordinary skill in the art. The computer program is stored in non-transitory computer readable recording medium, which in operation can realize the aspects of the present disclosure. Examples of the non-transitory computer readable recording medium include magnetic recording media, optical recording media, such as a hard disk, a floppy disk, and a magnetic tape, and optical recording media, such as a compact disk read only memory (CD-ROM) and a digital video disk (DVD), magneto-optical media, such as a floptical disk, and hardware devices that are specially configured to store and execute program instructions, such as a ROM, a random access memory (RAM), and a flash memory.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person of ordinary skill in the art unless defined to the contrary. Common terms as found in dictionaries should be interpreted in the context of the related technical writings not too ideally or impractically unless the present disclosure expressly defines them so.

Although exemplary aspects of the present disclosure have been described for illustrative purposes, those skilled in the art will appreciate that various modifications, additions and substitutions are possible, without the spirit and scope of the claimed invention. Specific terms used in this disclosure and drawings are used for illustrative purposes and not to be considered as limitations of the present disclosure. Therefore, exemplary aspects of the present disclosure have not been described for limiting purposes. Accordingly, the scope of the claimed invention is not to be limited by the above aspects but by the claims and the equivalents thereof.

What is claimed is:

1. A method performed by a video encoding apparatus for encoding pixels in an image, the method comprising:
    encoding an offset to be applied to a reference frame;
    generating predicted pixels of the pixels in the image, based on interpolating pixels in the reference frame and then adding the offset to the interpolated pixels; and
    encoding residual signals that are differences between the pixels in the image and the predicted pixels, by determining an encoding scheme of the residual signals,
    wherein the encoding of the residual signals comprises:
        skipping both transform and quantization for the residual signals and thereby encoding the residual signals for which both transform and quantization are skipped, when the determined encoding scheme of the residual signals corresponds to skipping of both transform and quantization;
        skipping transform and performing quantization for the residual signals and thereby encoding the quantized residual signals for which transform is skipped, when the determined encoding scheme corresponds to skipping of transform; and
        performing transform and quantization for the residual signals and thereby encoding the transformed and quantized residual signals when the determined encoding scheme corresponds to skipping neither transform nor quantization.

2. The method of claim 1, wherein the interpolating comprises interpolating the pixels in the reference frame down to a quarter pixel unit.

3. The method of claim 1, wherein the offset is included in the encoded data in units of a slice.

4. The method of claim 1, wherein the generating of the predicted pixels comprises:
    generating first predicted pixels by interpolating the pixels in the reference frame based on a motion vector; and
    generating the predicted pixels by adding the first predicted pixels to the offset.

5. A video encoding apparatus for encoding pixels in an image, comprising:
    an interpolation unit, implemented by one or more processors, configured to interpolate pixels in a reference frame;
    an offset adder, implemented by one or more processors, configured to add the interpolated pixels to an offset to be applied to the reference frame, and thereby generate predicted pixels of the pixels in the image; and
    an encoder, implemented by one or more processors, configured to
        encode the offset to be applied to the reference frame, and
        encode residual signals that are differences between the pixels in the image and the predicted pixels, by
            determining an encoding scheme of the residual signals,
        wherein the encoder is configured to
            skip both transform and quantization for the residual signals and thereby encode the residual signals for which both transform and quantization are skipped, when the determined encoding scheme of the residual signals corresponds to skipping of both transform and quantization,
            skip transform and perform quantization for the residual signals and thereby encode the quantized residual signals for which transform is skipped, when the determined encoding scheme corresponds to skipping of transform, and
            perform transform and quantization for the residual signals and thereby encode the transformed and quantized residual signals, when the determined encoding scheme corresponds to skipping neither transform nor quantization.

6. The apparatus of claim 5, wherein the interpolation unit is configured to interpolate the pixels in the reference frame down to a quarter pixel unit.

7. The apparatus of claim 5, wherein the offset is encoded in units of a slice.

8. The apparatus of claim 5, wherein the predicted pixels are generated by
    generating first predicted pixels by interpolating the pixels in the reference frame based on a motion vector, and adding the first predicted pixels to the offset.

9. The apparatus of claim 5, further comprising:
    an offset calculator configured to calculate the offset to be applied to the reference frame.

* * * * *